United States Patent [19]

Rosenblatt

[11] 4,173,833
[45] Nov. 13, 1979

[54] PSYCHOLOGICAL GAME

[76] Inventor: Martin Rosenblatt, 23909 Berdon St., Woodland Hills, Calif. 91367

[21] Appl. No.: 863,211

[22] Filed: Dec. 22, 1977

[51] Int. Cl.$^2$ .............................................. G09B 1/06
[52] U.S. Cl. .............................................. 35/22 R
[58] Field of Search .............. 35/22 R, 31 D, 31 F, 35/18 A, 32, 35 H; 273/240, 241, 258, 276, 287, 288, 289, 290

[56] References Cited

U.S. PATENT DOCUMENTS

| 910,242 | 1/1909 | Stocker | 35/31 D UX |
| 3,484,108 | 12/1969 | Geiger | 273/148 R X |
| 3,618,231 | 11/1971 | Nason | 273/240 X |
| 3,831,295 | 8/1974 | MacKay | 35/22 R |
| 3,888,025 | 6/1975 | Schmieder | 35/35 H |

Primary Examiner—William H. Grieb
Attorney, Agent, or Firm—Darby & Darby

[57] ABSTRACT

A psychological game which is designed to be used mainly as a tool to enhance personal exploration and growth. The essential pieces include a base with a multiplicity of recesses and a multiplicity of spheres of varying colors which can be fitted into the recesses. Each sphere has a portion which can be written on. The game is used by writing answers to specific questions on each sphere of the same color and then arranging all of the spheres to form a tetrahedron. The arrangement of specific color patterns adds significance when used in the processes of the invention.

2 Claims, 3 Drawing Figures

PSYCHOLOGICAL GAME

BRIEF SUMMARY OF THE INVENTION

This invention relates generally to psychological games and, in particular, to a psychological game designed to enhance personal exploration and growth. In addition, the apparatus of the present invention may be used for processes which are intended solely for enjoyment or for focus outside the self.

Briefly, in accordance with the present invention, there is provided a base having a multiplicity of evenly spaced recesses into which spheres of uniform size may be fitted in such a way that when any two spheres are placed in any two adjacent recesses, they touch but do not crowd each other. The spheres are of varying colors and each has a portion which can be written on. They may be arranged in a single layer on the base to form so-called base patterns or stacked to form the tetrahedral formations which are especially important in carrying out the processes of the invention and which will be described in detail later.

BRIEF DESCRIPTION OF THE DRAWINGS

Referring to the accompanying drawings:

FIG. 3 is a perspective view of one sphere showing a piece of removable tape which can be written on.

DETAILED DESCRIPTION OF THE INVENTION

Figure 1:
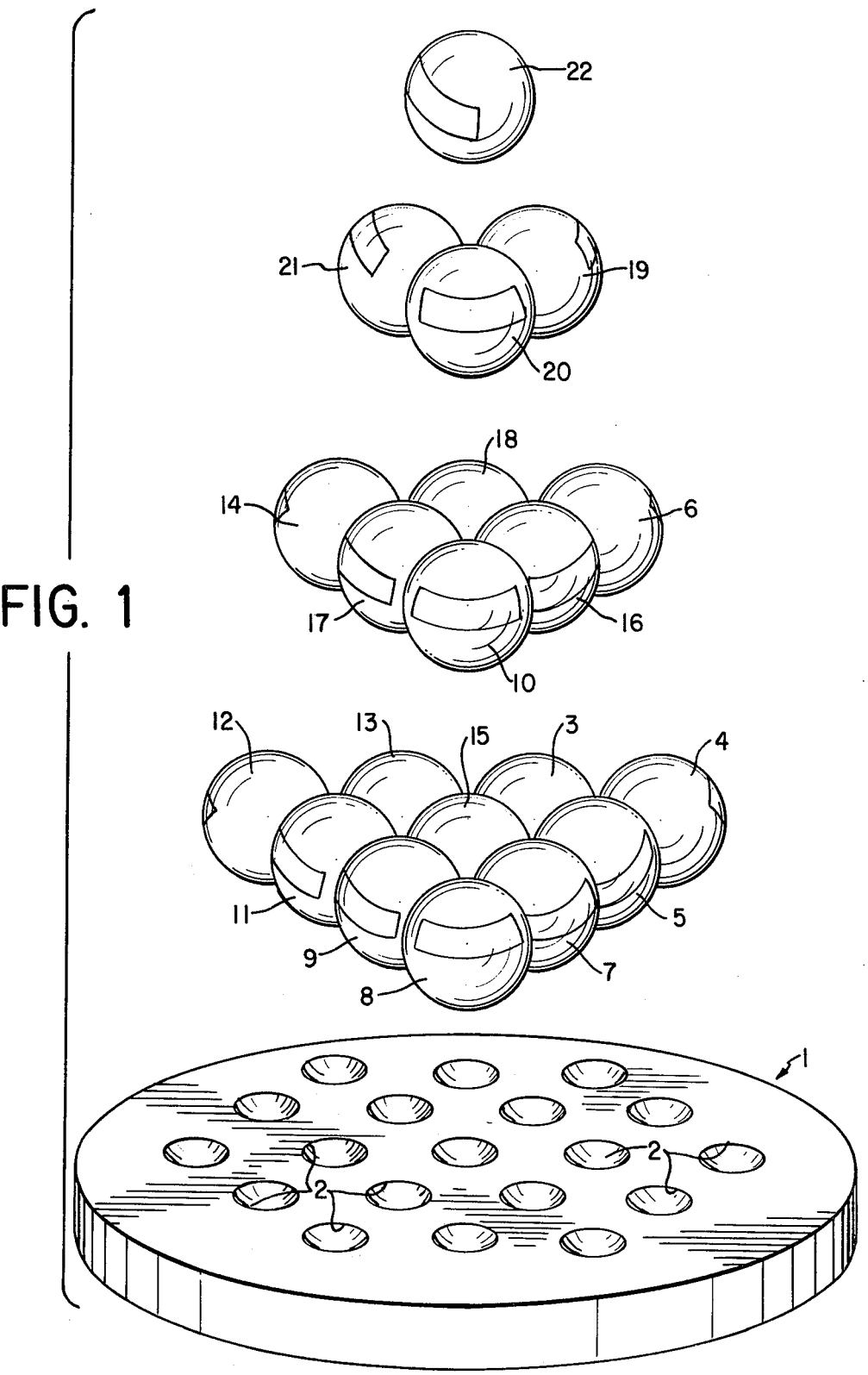
FIG. 1 is an exploded perspective view showing the arrangement of spheres in each layer when the spheres are stacked in a tetrahedral formation.
Figure 2:
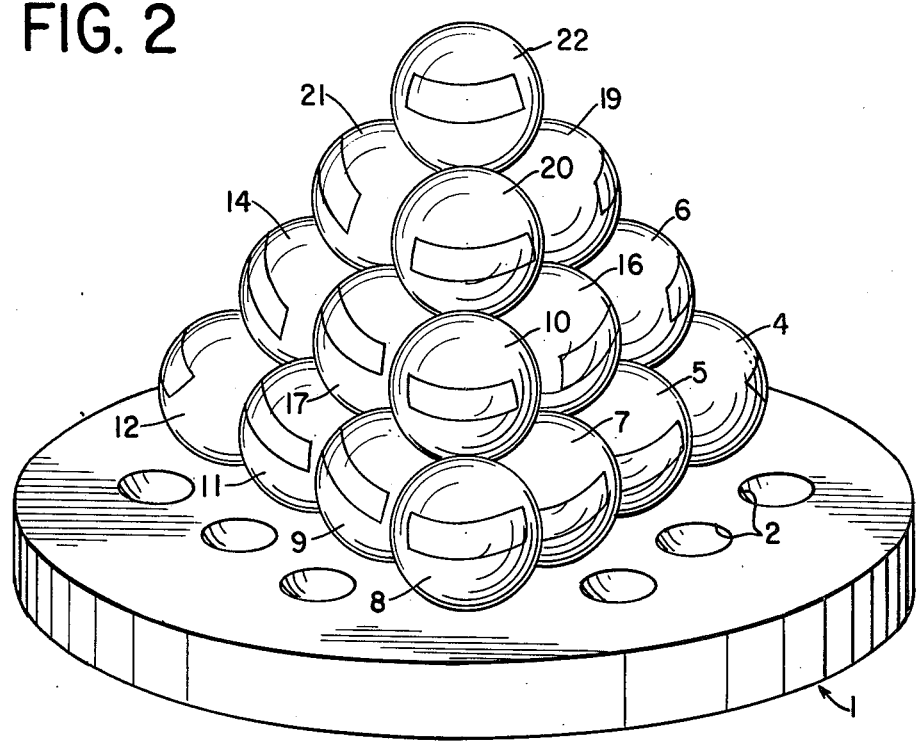
FIG. 2 is a perspective view of the game when the spheres are stacked in a tetrahedral formation.
Figure 3:
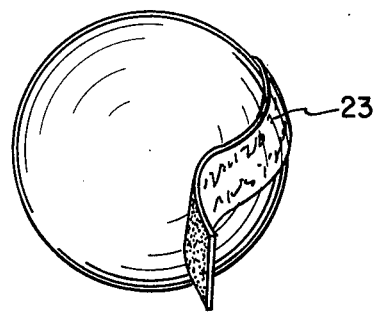

As shown in FIG. 1, the apparatus of the invention comprises a base, 1, having a multiplicity of evenly spaced recesses, 2, and a multiplicity of uniformly sized spheres, 3–22. In the preferred embodiment of the invention, the base has nineteen recesses and twenty spheres, although less complicated games with fewer spheres and fewer recesses in the base and more complicated games with more spheres and more recesses in the base may be used and are within the scope of this invention. The recesses in the base are uniformly spaced so that when any two spheres are placed in any two adjacent recesses, the spheres touch but do not crowd each other. Although the indentations in the base are referred to throughout as "recesses", they may in fact be holes, hollows, holders or any other type of construction which will prevent the spheres from rolling away from the position in which they are placed, and are not limited to recesses per se.

The base and spheres may be fashioned of any suitable material, e.g., wood, stone, metal, plastic or any other material which can be molded or formed to make the appropriate base and spheres. It is not necessary that the base and spheres be made of the same material.

In the preferred embodiment there are a total of twenty spheres, with five spheres of each of four colors. The preferred colors are white, blue, red, and yellow, but of course any colors or shades may be used. These spheres are a uniform size so that they fit compactly into the base and may be made of any suitable material as mentioned previously.

Additionally, each sphere includes at least one portion which can be written on. This portion may be either an area to which a piece of adhesive tape may be adhered, or an erasable surface which can be written on with a grease pencil, chalk, pencil or any other suitable writing implement and then wiped clean.

The size of the base and the spheres is not crucial, within the limitation that when the spheres are fitted into the recesses in the base, they touch but do not crowd each other. Alternatively, it is not necessary that the spheres touch so long as they are positioned close enough so that when a fourth sphere is positioned on top of any three spheres to form a tetrahedron, it remains there without falling through. The size of the entire apparatus may be scaled up or down as desired.

A process of the invention is any activity using the base and spheres. The apparatus described is especially useful as a tool to enhance personal exploration and growth. However, some processes may be intended solely for enjoyment or focus outside the self. Two examples of how the apparatus may be used for the purpose of exploration and growth are the following:

EXAMPLE I

Using the base and spheres of the preferred embodiment:

1. Respond to the question: "What are the facts or my feelings about the physical part of myself?" Write a word, phrase, or symbol that answers this question on the portion of each of four spheres of color A (any one of the four colors), which is adapted to be written on. Build a four sphere tetrahedron with these spheres in the manner in which spheres 3, 4, 5 and 6 of FIG. 1 are arranged.

2. Respond to the question: "What are the facts or my feelings about the mental part of myself?" Write a word, phrase or symbol that answers this question on the portion of each of four spheres of color B (a second of the four colors), which is adapted to be written on. Build a four sphere tetrahedron with these spheres in the manner in which spheres 7, 8, 9 and 10 of FIG. 1 are arranged.

3. In the same manner as in 1 and 2 above, respond to the question: "What are the facts or my feelings about the emotional part of myself?" Write an answer to this question on each of four spheres of color C and arrange these four spheres in the manner in which spheres 11, 12, 13 and 14 of FIG. 1 are arranged.

4. Use four spheres of color D, preferably white, to choose 1, 2, 3 or 4 areas of personal growth which in your opinion would be valuable to you and indicate one choice on each sphere. Place these spheres as shown by spheres 15, 16, 17 and 18 of FIG. 1.

5. On the fifth sphere of each of colors A, B, and C, respectively, write an answer to the question: "What am I going to do about the facts or my feelings about the physical, mental, and emotional parts of myself, respectively?" Be specific and make a personal commitment if possible. These spheres should be arranged to form the third layer, as shown by spheres 19, 20 and 21 of FIG. 1.

6. On the sphere of color D at the apex of the tetrahedron, sphere 22 of FIG. 1, answer the question: "What would I like most to do with my life or what would I like to become?"

EXAMPLE II

Using the base and spheres of the preferred embodiment:

1. Choose an issue, problem, goal or relationship to concentrate on and write it on a center sphere of color A, as shown by sphere 15 of FIG. 1.

2. Respond to the question: "What are the facts about this particular issue, problem, goal, or relationship?" Write a word, phrase or symbol which answers this question on each of four spheres of color B. Build a four sphere tetrahedron using these spheres as shown by spheres 3, 4, 5 and 6 of FIG. 1.

3. Respond to the question: "What are my feelings about this particular issue, problem, goal or relationship?" and write a word, phrase or symbol which answers this question on each of four spheres of color C. Build a four sphere tetrahedron using these spheres as shown by spheres 7, 8, 9 and 10 of FIG. 1.

4. In the same manner as in 2 and 3 above, respond to the question: "How would I like things to be with regard to this particular issue, problem, goal or relationship?" and write an answer on each of four spheres of color D. Arrange these spheres as shown by spheres 11, 12, 13 and 14 of FIG. 1.

5. Use three color A spheres to designate areas which are not in your power to change with regard to this particular issue, problem, goal or relationship. Arrange these spheres on the second layer as shown by spheres 16, 17 and 18 of FIG. 1.

6. On the fifth sphere of each of colors D, B, and C, respectively, write the answer to the question: "What areas concerning the facts, my feelings and how I would like things to be, respectively, regarding this particular issue, problem, goal or relationship are in my power to change?" Use these three spheres to form a third layer, as shown by spheres 19, 20 and 21 of FIG. 1.

7. On the apex sphere of color A, sphere 22 of FIG. 1, choose one area and make a specific commitment to yourself to change. Choose a commitment that you feel confident about in terms of being able to keep it successfully.

The steps one goes through in carrying out Examples I and II are known as processes. Honest and carefully thought out answers to the questions posed are essential if these processes are to serve their function of enhancing personal exploration and growth. The apparatus is useful as a tool in carrying out these processes because it gives the individual a means of organizing his thoughts in a tangible form and helps him evaluate and understand himself as a result. Tetrahedral symmetry is significant in aiding organization, but of course color symmetries other than the one described may be used.

It is within the contemplation of this invention that the steps for carrying out processes and for using the apparatus be recorded on magnetic tape, particularly cassette tapes, and included as part of the apparatus. These processes need not be limited to those designed to enhance personal exploration and growth, but may be intended solely for enjoyment, focus outside the self, or for two or more participants.

What is claimed is:

1. A psychological game apparatus for enhancing personal exploration and growth, comprising a flat base having at least ten recesses for receiving respective spheres in a contiguous relationship, and at least four tetrahedrons, each comprising four spheres of a selected color mounted in said recesses, each said tetrahedron comprising a base layer of three spheres and an apex of one sphere contacting its three associated base spheres, the base spheres of three of the tetrahedrons and the apex sphere of one tetrahedron being contained in said recesses, with each sphere containing an erasable legend written by the user in answer to a question on a predetermined topic pertaining to the user, the written legends on the spheres of each tetrahedron referring to one topic.

2. A psychological game apparatus according to claim 1, further including a fifth tetrahedron having three base spheres resting on the apex spheres of said three tetrahedrons and the base spheres of said one tetrahedron.

* * * * *